A. L. ALEXANDER.
VALVE.
APPLICATION FILED AUG. 27, 1914.
1,204,635.
Patented Nov. 14, 1916.
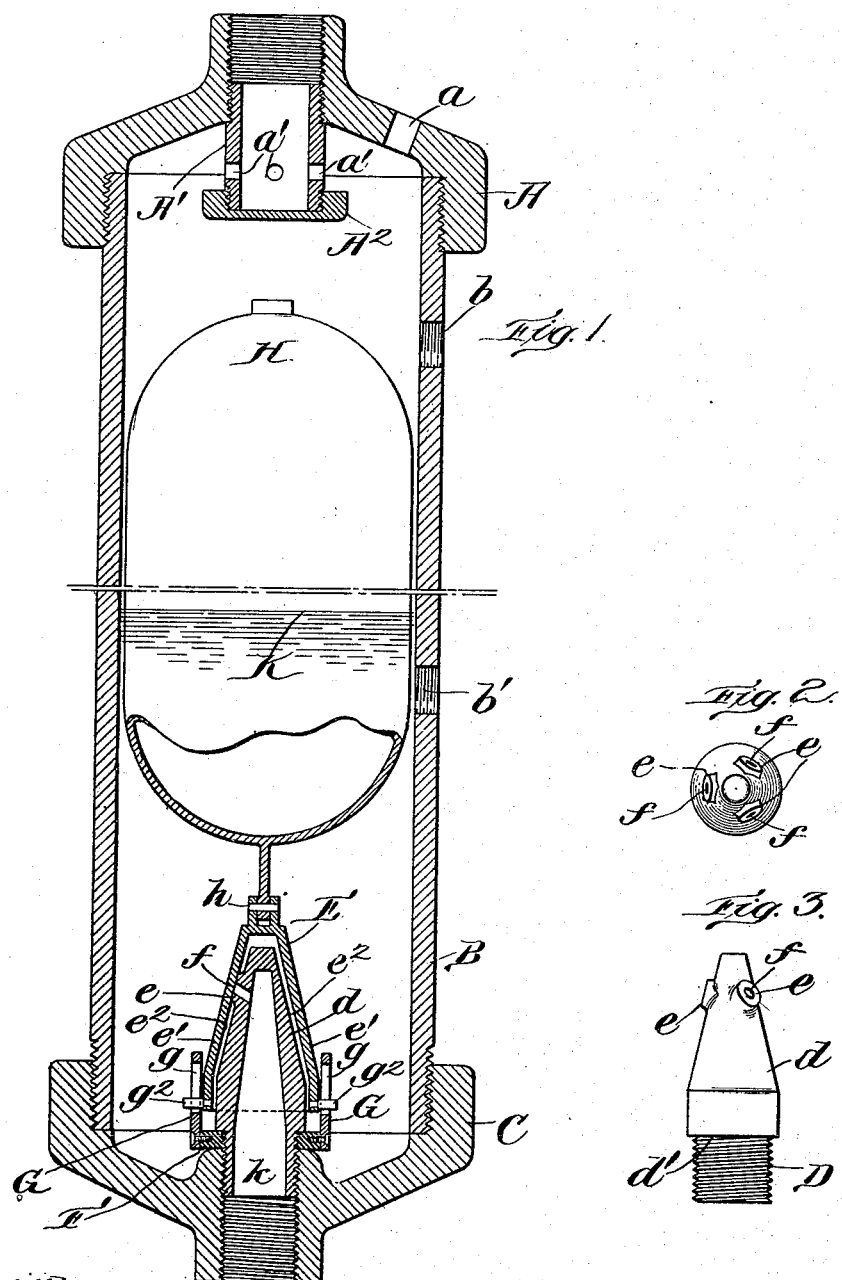

_UNITED STATES PATENT OFFICE._

ALBERT L. ALEXANDER, OF BOSTON, MASSACHUSETTS.

VALVE.

1,204,635.

Specification of Letters Patent.

Patented Nov. 14, 1916.

Application filed August 27, 1914. Serial No. 858,916.

*To all whom it may concern:*

Be it known that I, ALBERT L. ALEXANDER, of Boston, in the county of Suffolk and State of Massachusetts, have invented a new and useful Valve, of which the following is a specification.

My invention is an easily operating valve, and I disclose it as embodied in a water or steam trap although it is useful in many other embodiments.

One of the features of my invention is the small amount of force necessary to lift the valve particularly due to the combined sliding and lifting movement of the valve.

Another feature is a cushioning chamber to give a gentle closing of the valve.

Another feature is that my valve mechanism may be mounted in ordinary steam piping.

Other features will be pointed out below.

In the drawing Figure 1 is a central vertical section of a device embodying my invention; Fig. 2 is a plan of the valve proper; and Fig. 3 is an elevation of the same.

The members A, B and C represent ordinary steam piping, opening $a$ being provided for connection with an air cock and openings $b$ $b'$ for connection with a gage.

Member A' is in threaded engagement with member A and has ports $a'$ for distribution of the inlet. Member A has its lower end closed by nut $A^2$.

Valve seat member D is hollow and is in threaded engagement with member C and comprises conical body portion $d$ having bosses $e$ $e$ at intervals, each boss having a port $f$ leading within the body portion, these ports being at an angle to the longitudinal axis of the device and the engaging surfaces of the bosses being substantially parallel with the outer surface of said body portion.

The valve member E is hollow and surrounds the valve seat member, its inner wall being substantially parallel with the outer wall of the valve seat member but spaced therefrom except where it engages bosses $e$, the lower portion $e'$ forming a skirt, the space between members D and E forming a cushioning chamber $e^2$ to provide gentle seating of the valve.

Ring F is mounted between member C and a shoulder $d'$ on member D and has screwed to it two members G G, each having a slot $g$ to engage a pin $g^2$ fast to valve member E so that the upward movement of valve E will be limited by this pin and slot connection.

Member E is pivotally connected to float H by pin $h$ so that the float may move freely and easily in connection with the valve.

The ordinary water level is indicated at K and when the water rises above that level the valve will be lifted from the bosses to permit discharge through ports $f$ and passage $h$ the upward movement being limited by the pin and slot connection $g$ $g^2$ or it might be limited by engagement of the top of the float with member $A^2$. When the valve is closing some water will be trapped between members E and D in cushioning chamber $e^2$ and this will cause a gentle closing of the valve especially when the ports $f$ are nearly closed. This chamber will also keep member E in alinement with member D and will form a water seal for the valve. It will be clear that only a very small area is exposed to the pressure against lifting which is accomplished by a combined movement of lifting and sliding of the valve with reference to its seat. Likewise a very small force is required to close the valve, this being furnished by the weight of float H in inclosing member B.

The longitudinal projection of the engaging surfaces of bosses $e$ is very small on account of the angular position of said surfaces and therefore the working portion of valve E is substantially balanced because of the same pressure within member E and outside thereof.

A great advantage of my invention is that it may be readily used with ordinary piping and further that it combines the compactness of a lift valve with the advantages of a slide valve.

Further advantages are the compactness of the vessel in which the device is operated and cheapness of construction.

What I claim is:

1. A device of the character described comprising a conical hollow body portion; a boss on said body portion forming a valve seat, the end surface of said boss being parallel with the adjacent wall of said body portion, said boss having a port leading within said body portion, and a valve to engage said boss and having a skirt surrounding, parallel to, but spaced from, said body portion.

2. A device of the character described comprising a hollow member; a boss on said member having an engaging surface at an angle to the vertical, said boss having a port leading to the interior of said member; a valve having a portion parallel to said engaging surface and having also another portion surrounding, but spaced from, said hollow member to permit the presence of water between said other portion and said member; and a float movable vertically and moving said valve vertically so as to move the first-mentioned portion thereof into and out of engagement with the engaging surface of said boss.

3. A device of the character described comprising a hollow member; a boss on said member having an engaging surface at an angle to the vertical, said boss having a port leading to the interior of said member; a valve having a portion to engage said engaging surface and having also another portion surrounding, but spaced from, said hollow member to permit the presence of fluid between said other portion and said member; and a float moving substantially vertically and moving said valve substantially vertically so as to move the first-mentioned portion in to and out of engagement with the engaging surface of said boss.

4. A device of the character described comprising a hollow member; a boss on said member having an engaging surface at an angle to the vertical, said boss having a port leading to the interior of said member; a valve having a portion parallel to said engaging surface and having also another portion outside of, and spaced from, said hollow member to permit the presence of fluid between said other portion and said member when the valve is closed; and a movable float moving the first-mentioned portion into and out of engagement with the engaging surface of said boss and moving said other portion toward said hollow member as the valve is closing.

5. A device of the character described comprising a hollow member having a port; a boss on said member having an engaging surface at an angle to the vertical; a valve to close said port and having a portion parallel to said engaging surface and having another portion spaced from said hollow member to permit the presence of fluid between said other portion and said member; and a float moving said valve so as to move the first-mentioned portion into and out of engagement with the engaging surface of said boss and moving said other portion toward said hollow member as the valve is closing.

6. A device of the character described comprising a member having a port; a boss on said member having an engaging surface; a valve to close said port and having a portion to engage said engaging surface of the boss and having another portion spaced from said member to permit the presence of fluid between said other portion and said member; and a float moving said valve to move the first-mentioned portion into and out of engagement with the engaging surface of said boss and moving said other portion toward said member as the valve is closing, the engaging surfaces of the valve and boss being obliquely disposed with relation to the direction of movement of the valve.

7. A device of the character described comprising a hollow member; a boss on said member having an engaging surface at an angle to the vertical, said boss having a port leading to the interior of said member; a valve having a portion parallel to said engaging surface and having also another portion outside of, and spaced from, said hollow member to permit the presence of fluid between said other portion and said member; and a float movable substantially vertically and moving said valve substantially vertically so as to move the first-mentioned portion into and out of engagement with the engaging surface of said boss and moving said other portion toward said hollow member as the valve is closing.

8. A device of the character described comprising a member having a port; a boss on said member having an engaging surface at an angle to the vertical; a valve to close said port and having a portion to engage said engaging surface and having another portion spaced from said member to permit the presence of fluid between said other portion and said member; and a float moving said valve to move the first-mentioned portion into and out of engagement with the engaging surface of said boss and moving said other portion toward the hollow member as the valve is closing.

ALBERT L. ALEXANDER.

Witnesses:
 GEORGE A. ROCKWELL,
 ARTHUR F. RANDALL.

Copies of this patent may be obtained for five cents each, by addressing the "Commissioner of Patents, Washington, D. C."